(12) United States Patent
Modarres Razavi et al.

(10) Patent No.: US 11,601,241 B2
(45) Date of Patent: Mar. 7, 2023

(54) NARROWBAND POSITIONING REFERENCE SIGNAL CONFIGURATION

(71) Applicant: TELEFONAKTIEBOLAGET LM ERICSSON (PUBL), Stockholm (SE)

(72) Inventors: Sara Modarres Razavi, Linköping (SE); Ritesh Shreevastav, Upplands Väsby (SE); Fredrik Gunnarsson, Linköping (SE); Xingqin Lin, Santa Clara, CA (US); Iana Siomina, Täby (SE); Yutao Sui, Solna (SE); Gerardo Agni Medina Acosta, Märsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/968,007

(22) PCT Filed: Feb. 14, 2019

(86) PCT No.: PCT/IB2019/051212
§ 371 (c)(1),
(2) Date: Aug. 6, 2020

(87) PCT Pub. No.: WO2019/159108
PCT Pub. Date: Aug. 22, 2019

(65) Prior Publication Data
US 2022/0182197 A1 Jun. 9, 2022

Related U.S. Application Data

(60) Provisional application No. 62/630,576, filed on Feb. 14, 2018.

(51) Int. Cl.
*H04L 5/00* (2006.01)
*H04L 5/14* (2006.01)

(52) U.S. Cl.
CPC .......... *H04L 5/0048* (2013.01); *H04L 5/1476* (2013.01)

(58) Field of Classification Search
CPC .......................... H04L 5/0048; H04L 5/1476
See application file for complete search history.

(56) References Cited

U.S. PATENT DOCUMENTS 10,045,325 B2 * 8/2018 Yoon ..................... G01S 5/0036
10,547,421 B2 * 1/2020 Palanivelu ............ H04L 5/0005
(Continued)

FOREIGN PATENT DOCUMENTS

EP 2860903 A1 * 4/2015 .......... H04L 5/0048
EP 2860903 B1 7/2017
(Continued)

OTHER PUBLICATIONS

LG Electronics, Discussion on DL aspects in TDD NB-IoT, 3GPP TSG RAN WG1 Meeting 91, R1-1719883, Reno, USA, Nov. 27-Dec. 1, 2017.
(Continued)

*Primary Examiner* — Jay P Patel

(57) ABSTRACT

Systems and methods for configuring Narrowband Positioning Reference Signals (NPRS) for NB-IoT are provided. A network node generates and transmits NPRS configuration information including a first NPRS bitmap for FDD mode and/or a second NPRS bitmap for TDD mode. A wireless device can determine a NPRS configuration in accordance with the second NPRS bitmap for TDD mode and perform measurements using the NPRS configuration.

26 Claims, 11 Drawing Sheets

(56) References Cited

U.S. PATENT DOCUMENTS

| | | | |
|---|---|---|---|
| 10,869,165 | B2 | 12/2020 | Yamada |
| 11,082,834 | B2 | 8/2021 | Uchino |
| 2010/0273506 | A1* | 10/2010 | Stern-Berkowitz .......................... G01S 5/0045 455/456.1 |
| 2018/0049151 | A1* | 2/2018 | Yoon ..................... H04L 5/0048 |
| 2018/0097596 | A1* | 4/2018 | Palanivelu ............ H04L 5/0005 |
| 2018/0217228 | A1* | 8/2018 | Edge ..................... H04W 64/00 |
| 2018/0281676 | A1* | 10/2018 | Engineer .................. B60Q 5/00 |
| 2019/0245663 | A1* | 8/2019 | Kim ..................... H04L 5/0091 |
| 2019/0261308 | A1* | 8/2019 | Modarres Razavi ..... G01S 5/10 |
| 2019/0373646 | A1* | 12/2019 | Shin ..................... H04L 5/0053 |
| 2020/0169367 | A1* | 5/2020 | Palanivelu ............ H04L 5/0005 |
| 2020/0178311 | A1* | 6/2020 | Shin .................. H04W 74/0833 |
| 2021/0227491 | A1* | 7/2021 | Shin ..................... H04W 24/08 |
| 2021/0368500 | A1* | 11/2021 | Centonza ............... H04W 76/15 |
| 2021/0376983 | A1* | 12/2021 | Palanivelu ............... H04W 4/70 |
| 2022/0182197 | A1* | 6/2022 | Modarres Razavi .......................... H04L 5/0094 |

FOREIGN PATENT DOCUMENTS

| | | |
|---|---|---|
| JP | 2015173429 A | 10/2015 |
| JP | 2017500793 A | 1/2017 |
| RU | 2628011 C2 | 8/2017 |
| WO | 2014151150 A1 | 9/2014 |
| WO | 2014165289 A1 | 10/2014 |
| WO | 2014204171 A1 | 12/2014 |
| WO | 2015103579 A1 | 7/2015 |
| WO | 2015133825 A1 | 9/2015 |
| WO | 2015148997 A1 | 10/2015 |
| WO | 2016047246 A1 | 3/2016 |
| WO | WO-2017056112 A1 * | 4/2017 ............... B60Q 5/00 |
| WO | 2017194675 A1 | 11/2017 |
| WO | WO-2017204899 A1 * | 11/2017 ............... G01S 1/04 |
| WO | 2018025794 A1 | 2/2018 |
| WO | 2018030847 A1 | 2/2018 |
| WO | WO-2018064537 A1 * | 4/2018 .......... H04L 27/2611 |

OTHER PUBLICATIONS

3GPP, "3rd Generation Partnership Project; Technical Specification Group Services and System Aspects; Release 14 Description; Summary of Rel-14 Work Items, (Release 14)", TR 21.914 V0.9.0, Sep. 2017.

ZTE, "Remaining details on downlink aspects to support TDD NB-IoT", 3GPP TSG RAN WG1 Meeting #91, R1-1719717, Reno, USA, Nov. 27-Dec. 1, 2017.

ISR and Written Opinion from corresponding application PCT/IB2019/051212.

Ericsson, On Introduction of OTDOA for NB-IoT, 3GPP TSG-RAN2 Meeting #97, R2-1701034, Athens, Greece, Feb. 13-17, 2017.

Ericsson, On design of OTDOA positioning reference signal, 3GPP TSG-RAN1 Meeting #87, R1-1611116, Reno, Nevada, Nov. 14-18, 2016.

* cited by examiner

| N/A (NSSS) | SF1 (Specials) | SF2 (UL) | SF3 | SF4 | N/A (NPSS) | SF6 (Specials) | SF7 | SF8 | N/A (NPBCH) |
|---|---|---|---|---|---|---|---|---|---|

NARROWBAND POSITIONING REFERENCE SIGNAL CONFIGURATION

CROSS REFERENCE TO RELATED APPLICATIONS

This application claims the benefit of U.S. Provisional Application No. 62/630,576 filed on Feb. 14, 2018, the entire contents of which are hereby incorporated by reference.

TECHNICAL FIELD

The present disclosure generally relates to wireless communications and wireless communication networks.

INTRODUCTION

The Internet of Things (IoT) is a vision for the future world where everything that can benefit from a connection will be connected. Cellular technologies are being developed or evolved to play a role in the IoT world, particularly the machine type communication (MTC). MTC is characterized by lower demands on data rates than, for example, mobile broadband, but with higher requirements on low cost device design, better coverage, and ability to operate for years on batteries without charging or replacing the batteries, etc. To meet the IoT design objectives, standardization bodies such as Third Generation Partnership Project (3GPP) have standardized Narrowband IoT (NB-IoT) in Release 13 to include a system bandwidth of 180 kHz and target improved coverage, long battery life, low complexity communication design, and network capacity that is sufficient for supporting a massive number of devices.

To further increase the impact of NB-IoT, improving narrowband support for positioning is an aspect of NB-IoT in Release 14. The enhancement will be designed to maintain the ultra-low cost and complexity of the Release 13 NB-IoT user equipment (UE) where appropriate, as well as the coverage and capacity of the NB-IoT network.

Location-based services and emergency call positioning drive the development of positioning in wireless networks. Positioning support in 3GPP Long Term Evolution (LTE) was introduced in Release 9. This enables operators to retrieve position information for location-based services and to meet regulatory emergency call positioning requirements.

Positioning in LTE is supported by the architecture in FIG. 1, with interactions between a wireless device (UE 110) and a location server, such as an Evolved Serving Mobile Location Center (E-SMLC) 130, is via the LTE Positioning Protocol (LPP). Moreover, there are also interactions between the location server 130 and the radio access node (eNodeB 120) via the LPPa protocol, to some extent supported by interactions between the eNodeB 120 and the wireless device 110 via the Radio Resource Control (RRC) protocol. The interfaces between Mobility Management Entity (MME) 132 and Gateway Mobile Location Centre (GMLC) 134 network nodes are also illustrated in FIG. 1.

The following positioning techniques are considered in LTE:

Enhanced Cell ID. Cell ID information to associate the UE to the serving area of a serving cell, and then additional information to determine a finer granularity position.

Assisted GNSS (Global Navigation Satellite Systems). GNSS information retrieved by the UE, supported by assistance information provided to the UE from E-SMLC OTDOA (Observed Time Difference of Arrival). The UE estimates the time difference of reference signals from different base stations and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration In LTE, the basic concept of OTDOA is that a location/positioning server, e.g. an E-SMLC 130, requests the position of a UE 110 which triggers the UE 110 to estimate time of arrival (TOA) of signals received from multiple radio access nodes, such as eNBs 120. The TOAs from several neighboring eNBs are subtracted from a TOA from a reference eNB 120 to form Observed Time Difference of Arrivals that the UE 110 reports to the network. These measurements are known as Reference Signal Time Difference (RSTD) measurements. Based on the reported RSTD measurements and known positions of the involved eNBs, the positioning server 130 can estimate the position of the UE 110 by using multilateration techniques.

SUMMARY

It is an object of the present disclosure to obviate or mitigate at least one disadvantage of the prior art.

There are provided systems and methods for configuring Narrowband Positioning Reference Signals (NPRS) for NB-IoT.

In a first aspect of the present disclosure, there is provided a method performed by a wireless device. The wireless device can comprise processing circuitry and be configured to receive Narrowband Positioning Reference Signal (NPRS) configuration information for a cell, the NPRS configuration information including at least one of a first NPRS bitmap for Frequency Division Duplex (FDD) mode and/or a second NPRS bitmap for Time Division Duplex (TDD) mode. Responsive to determining that the cell operates in TDD mode, the wireless device determines a NPRS configuration in accordance with the second NPRS bitmap for TDD mode. The wireless device can perform measurements using the NPRS configuration.

In some embodiments, the wireless device transmits a capabilities indication indicating the wireless device supports TDD mode. Transmitting the capabilities indication can be responsive to receiving a capabilities request.

In some embodiments, the second NPRS bitmap for TDD is a shortened bitmap. The second NPRS bitmap for TDD can be less than 10 bits in length.

In some embodiments, determining the NPRS configuration includes mapping the second NPRS bitmap to subframe numbers.

In some embodiments, performing measurements includes estimating time of arrival (TOA) signals from at least one radio access node. Performing measurements can include determining Observed Time Difference of Arrival (OTDOA) measurements. In some embodiments, the wireless device can transmit at least one measurement report.

In some embodiments, the wireless device is a Narrowband Internet of Things (NB-IoT) FDD device configured to perform measurements on a NB-IoT TDD downlink carrier.

In another aspect of the present disclosure, there is provided a method performed by a network node. The network node can comprise processing circuitry and be configured to obtain Narrowband Positioning Reference Signal (NPRS) configuration and one of Frequency Division Duplex (FDD) and Time Division Duplex (TDD) mode information associated with a cell. Responsive to determining that the cell operates in TDD mode, the network node generates NPRS configuration information for the cell, the NPRS configuration information including a NPRS bitmap for TDD mode. The network node transmits the NPRS configuration information to a wireless device.

In some embodiments, the network node receives a capabilities indication indicating that the wireless device supports TDD mode. Receiving the capabilities indication can be responsive to transmitting a capabilities request.

In some embodiments, transmitting the NPRS configuration information is responsive to receiving a positioning request.

In some embodiments, the NPRS bitmap for TDD mode is a shortened bitmap. In some embodiments, the NPRS bitmap for TDD mode can be less than 10 bits in length. The length of the NPRS bitmap for TDD mode can be based at least in part on an available number of downlink subframes.

In some embodiments, the NPRS configuration information can include an indication of whether an NPRS carrier is an anchor carrier.

In some embodiments, generating the NPRS bitmap for TDD mode includes removing at least one of a subframe used for uplink in TDD and a special subframe for TDD. Generating the NPRS bitmap for TDD can include removing a subframe used for at least one of Narrowband Primary Synchronization Signal (NPSS), Narrowband Secondary Synchronization Signal (NSSS), and Narrowband Physical Broadcast channel (NPBCH).

In some embodiments, the network node derives a positioning estimate for the wireless device in accordance with a received measurement report.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 5 illustrates an example NB-IoT anchor carrier structure.

DETAILED DESCRIPTION

Figure 1:
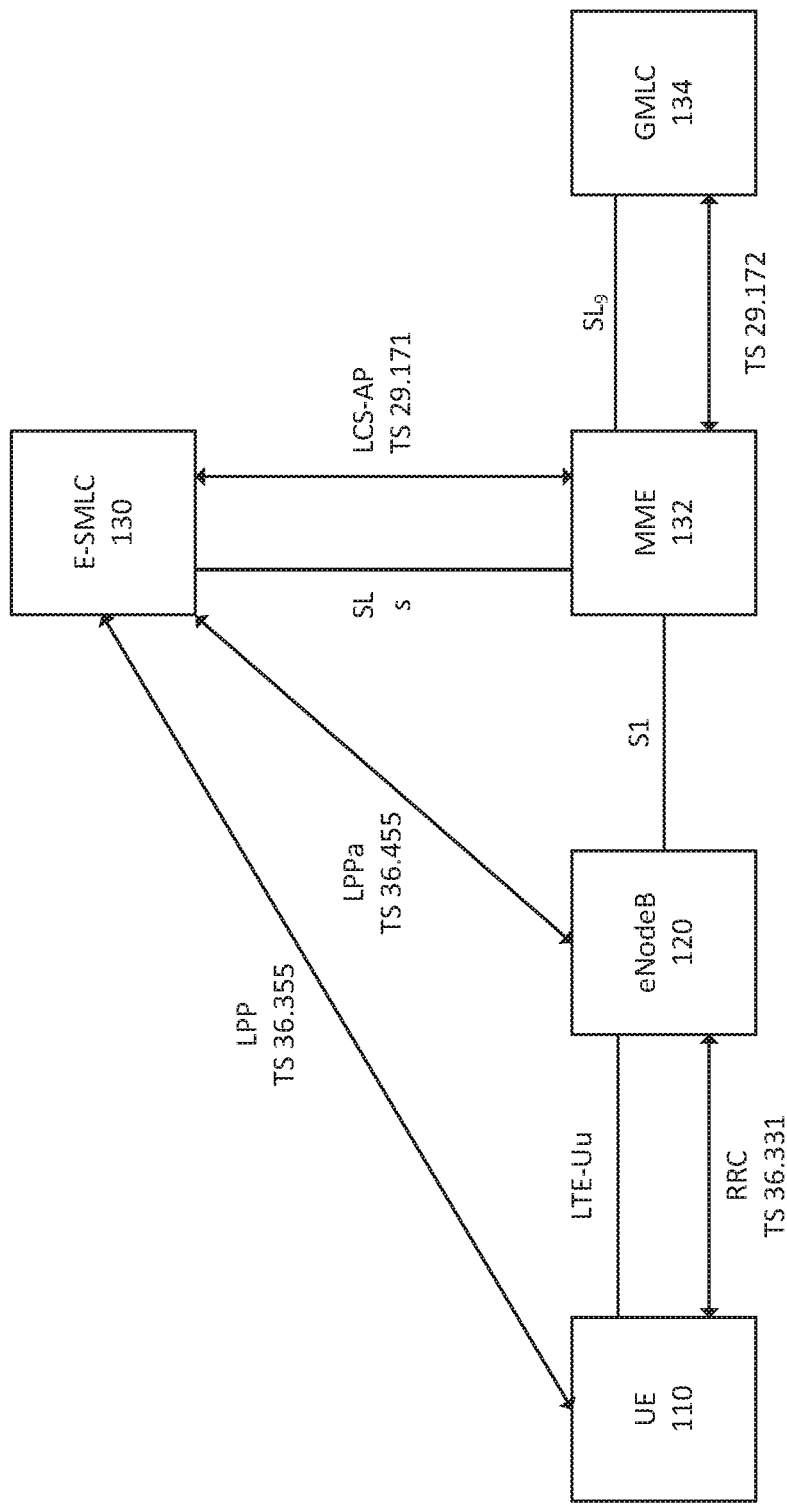
FIG. 1 illustrates an example network architecture.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 9.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIGS. 11 and 13.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 2:
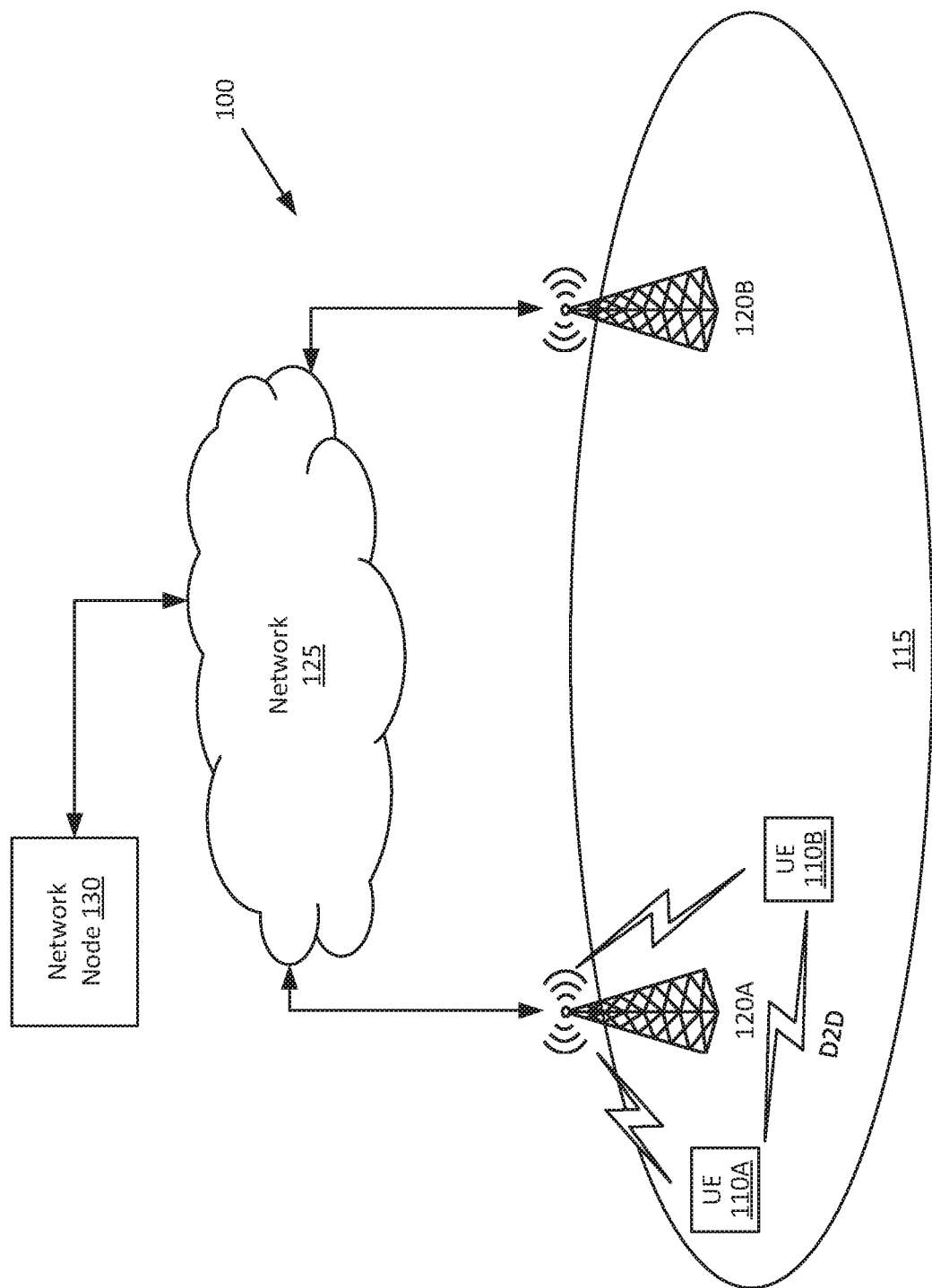
FIG. 2 illustrates an example wireless network.

FIG. 2 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

In some embodiments, network node 130 can be a location server 130, such as an E-SMLC. Location server 130 can exchange signals directly, or indirectly, with UEs 110, radio access nodes 120 and/or other network nodes as was illustrated in FIG. 1.

It has been considered to introduce support for Time Division Duplex (TDD) operation into NB-IoT. One objective is to specify TDD support for in-band, guard-band, and standalone operation modes of NB-IoT. The design shall assume no UL compensation gaps are needed by the UE and strive towards a common design among the deployment modes. This can include relaxations of MCL and/or latency and/or capacity targets to be considered by RAN1. The baseline is to support similar features as 3GPP Release 13 NB-IoT, additionally considering small-cells scenarios.

In addition to the baseline, the following can be supported:
  Based on Release 14 Frequency Division Duplex (FDD) designs:
    OTDOA positioning using Rel-14 NPRS RE patterns and sequences. Subframe configurations Part A and Part B shall be used with necessary amendments, if any.
    Non-anchor carrier operation for paging and random access
    UE category NB2, with the same TBS table as FDD, and support for 1 and 2 UL/DL HARQ processes. The support of 2 UL/DL HARQ processes by UE is an optional capability available to Cat NB2, i.e. same way as FDD.
    Non-anchor carrier operation for system information (MIB-NB and any SIB-NB) can be considered.
    Specify band specific requirements for band 41.

From the above objectives, the Release 15 NB-IoT TDD positioning design can be considered to be based in part on Release 14 FDD design and using Release 14 NPRS RE patterns and sequences. In NB-IoT FDD, the NRPS subframes are configured by using so called Part A and/or Part B. Part A uses a bitmap to configure the NPRS subframes, and Part B specifies the number of consecutive downlink NPRS subframes $N_{NPRS}$, the periodicity of the NPRS subframes $T_{NPRS}$, and an offset of the starting subframe indicated by $\alpha T_{NPRS}$. Here, $N_{NPRS} \in \{10, 20, 40, 80, 160, 320, 640, 1280\}$, $T_{NPRS} \in \{160, 320, 640, 1280\}$ ms, and $$\alpha \in \left\{0, \frac{1}{8}, \frac{2}{8}, \frac{3}{8}, \frac{4}{8}, \frac{5}{8}, \frac{6}{8}, \frac{7}{8}\right\}.$$

The conventional OTDOA positioning support for NB-IoT is provided only for FDD system, therefore there is a lack of standardization support for a TDD-based UE and/or network to provide positioning estimation based on NPRS.

As the DL design of NB-IoT TDD has some differences compared to the NB-IoT FDD design, it will be appreciated that not all the principles of the conventional NPRS configuration in NB-IoT FDD can be directly applied.

Some embodiments herein will describe mechanism for configuring the NB-IoT NPRS for NB-IoT TDD. Some embodiments consider the NB-IoT TDD design and minimize the LPP signaling overhead for setting up the UE for OTDOA positioning. Absent the embodiments provided herein, a UE may not be able to correctly and in the right time instances receive NPRS. This may lead to a failed positioning procedure and/or incorrect UE location, which may be crucial for both emergency and non-emergency applications.

According to some embodiments described herein:
A wireless device (e.g. a UE, an NB-IoT device, etc.) can determine a TDD positioning reference signal configuration and use the determined configuration for performing a positioning measurement. The measurement can be reported to a network node (e.g., radio access node or positioning node such as E-SMLC) or can be used for positioning, location-based or location-aware services or applications in the wireless device itself.

A network node (e.g., a location/positioning node such as an E-SMLC) can determine TDD positioning reference signals configuration in one or more cells and/or carriers to be measured by a UE, create the assistance data based on the determined configuration, and send the assistance data to one or more UEs via dedicated or multicast/broadcast signaling. In one example, the determining may be based on signaling from one or more radio network nodes or O&M. The network node may also receive one or more measurements based on the provided assistance data and use it for determining UE location.

A radio network node (e.g., an eNodeB) can configure and transmit one or more TDD positioning reference signals (e.g., TDD NPRS). It can inform, implicitly or explicitly, another network node (e.g., another eNodeB or E-SMLC or O&M) about the TDD configuration and/or TDD NPRS configuration configured in one or more cells and/or carriers associated with the radio network node.

An example of a signal can be used for TDD positioning reference signal is TDD NPRS used for NB-IoT positioning and characterized by at least one of:
  The signal sequence of the TDD NPRS is different from the sequence of FDD NPRS for the same subframe index, and
  NPRS is transmitted on a TDD carrier, and
  The density of the TDD NPRS signal in a subframe differs from the density of the FDD NPRS in the corresponding deployment modes, and
  The signaling of the configurations of the TDD NPRS on a TDD NB-IoT carrier is different from the signaling of the configurations of the FDD NPRS on an FDD NB-IoT carrier.

Figure 3:
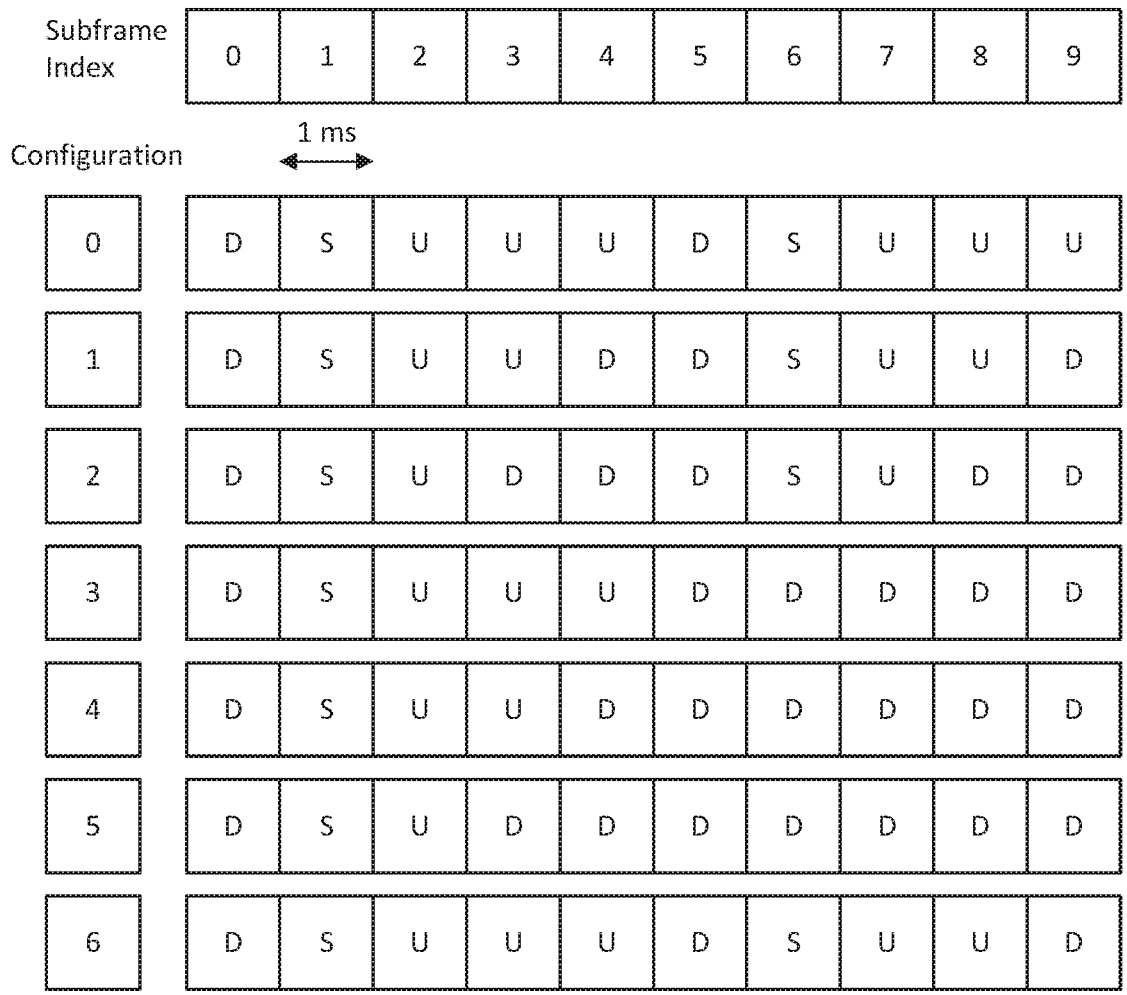
FIG. 3 illustrates an example of LTE TDD configurations.

In a TDD system, unlike the FDD system, the UL and DL are sharing the same carrier frequency. FIG. 3 illustrates the available LTE TDD configurations 140 as described by the LTE standard, where D indicates DL subframe, U indicates UL subframe, and S indicates special subframe. For NB-IoT TDD, the same radio frame structure as LTE TDD can be adopted, without supporting configuration #0. As shown in FIG. 3 there are seven different TDD configurations that are supported in the current LTE system (note that NB-IoT TDD does not support configuration #0). Three of the TDD configurations (i.e. configuration #3, #4, and #5) have a Downlink-to-Uplink switching periodicity equal to 10 ms, meaning that there is only one "special subframe" per radio frame. All the other TDD configurations (i.e. configuration #0, #1, #2, and #6) use a Downlink-to-Uplink switching periodicity equal to 5 ms, where there are two "special subframes" per every radio frame. The "special subframes" consists of three fields: Downlink Pilot Time Slot (DwPTS), Guard Period (GP), and Uplink Pilot Time Slot (UpPTS), which have variable lengths depending on the special subframe configuration. Due to UL timing advance (TA), the "special subframes" is inserted between DL subframe and UL subframe to offer the UE preparing time to switch between DL to UL.

Figure 4:
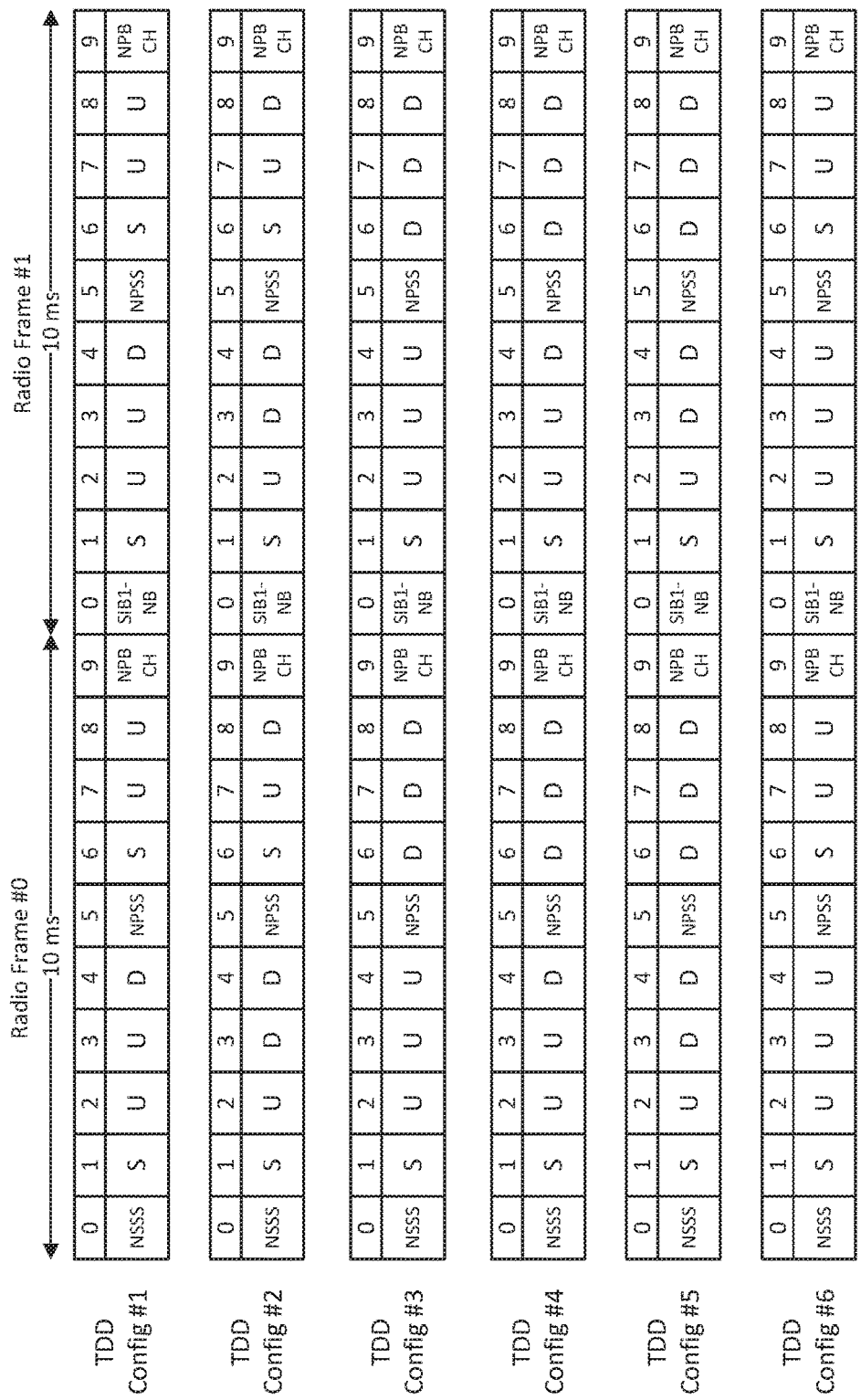
FIG. 4 illustrates an example mapping of NPSS, NSSS/SIB1-NB and NBPCH in NB-IoT TDD.

FIG. 4 illustrates the mapping of the Narrowband Primary Synchronization Signal (NPSS), Narrowband Secondary Synchronization Signal (NSSS), and Narrowband Physical Broadcast channel (NPBCH) for NB-IoT TDD 150. FIG. 4 provides a view on subframes that remain available for performing DL transmissions, which can in principle be used for NPDCCH/NPDSCH, or when any of those subframes are declared as invalid, then some other DL signals (e.g., NPRS) can make use of them.

As previously described, in NB-IoT FDD, the NPRS subframes are configured by using so called Part A and/or Part B. Part A uses a bitmap to configure the NPRS subframes, and Part B specifies the number of consecutive NPRS subframes $N_{NPRS}$, the periodicity of the NPRS subframes $T_{NPRS}$, and an offset of the starting subframe indicated by $\alpha T_{NPRS}$. Here, $N_{NPRS} \in \{10, 20, 40, 80, 160, 320, 640, 1280\}$, $T_{NPRS} \in \{160, 320, 640, 1280\}$ ms, and $$\alpha \in \left\{0, \frac{1}{8}, \frac{2}{8}, \frac{3}{8}, \frac{4}{8}, \frac{5}{8}, \frac{6}{8}, \frac{7}{8}\right\}.$$

Part A and Part B can also be used for the configuration of NB-IoT TDD NPRS for each of the carriers that are used for OTDOA measurements. In principle, Part A can be directly applied in NB-IoT TDD. But it is noted that in NB-IoT TDD, there are always subframes that cannot be used for DL NPRS transmission, i.e. UL subframes and special subframes. It is preferable to have a bitmap that only indicates the DL subframes. This can significantly reduce the LPP signaling overhead of OTDOA measurement, as the NPRS configurations of each NPRS carrier is signaled to each UE in a dedicated manner.

Shortened NPRS Bitmaps

Shortened NPRS Bitmaps for the Anchor Carrier

In some embodiments, the overhead for signaling the bitmap can be further reduced if it can be indicated whether a NPRS carrier is an anchor carrier or not. In an anchor carrier, subframes that are used by NPSS, NSSS, NPBCH are not available for NPRS either. The following discussion applies only to an anchor carrier.

FIG. 5 illustrates an example anchor carrier structure 160 for NB-IoT. The NSSS, NPSS, and NBPCH subframes (i.e., SF0, SF5, and SF9) shall not be used for NPRS, and have been marked as "N/A" (not available). SF2 is an UL subframe for all the TDD configurations, therefore it cannot be used for NPRS. Thus, for the example anchor carrier, only the subframes that can take the role of "Invalid subframes" (i.e., invalid for transmitting NB-IoT TDD data, but valid for transmitting other signals like NPRS), and at the same time are DL subframes (i.e., depending on the TDD configuration) are SF3, SF4, SF7, and SF8, meaning that the NPRS could perhaps only be received on those subframes.

Given that is known that in NB-IoT TDD only certain subframes can be used for transmitting DL NPRS transmissions, it is preferable to have a bitmap that only indicates those DL subframes. This can reduce the LPP signaling overhead of OTDOA measurement, as the NPRS configurations of each NPRS carrier is signaled to each UE in a dedicate manner.

For example, in some embodiments, the bitmap for NB-IoT TDD could consist of only four bits, indicating from left (MSB) to right (LSB) a mapping over subframe #3, #4, #7, and #8 respectively, and where the subframes not containing NPRS are indicated with '0'. Subframes containing NPRS are indicated with '1'. A non-limiting example of the bit combinations is shown in Table 1 for illustrative purposes.

TABLE 1

Shortened NPRS bitmap for TDD NB-IoT usable on the anchor carrier

| SF3 | SF4 | SF7 | SF8 |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

Shortened NPRS Bitmaps for the Non-Anchor Carrier

Similarly, in some embodiments, the NPRS bitmap can also be shortened for the non-anchor carrier, but not as much as in the anchor carrier case since in the non-anchor carrier there are more DL subframes that could be used for receiving NPRS. For example, the candidate DL subframes for receiving NPRS could be SF3, SF4, SF5, SF6, SF7, SF8, and SF9 (i.e., depending on the TDD configuration), and depending on whether new agreements are reached or not for the non-anchor carrier (e.g., so far, it has been agreed that SIB1 will be transmitted on the non-anchor carrier at least in SF #0). Hence, on the non-anchor carrier the NPRS bitmap could consists of 7 bits.

Shortened NPRS Bitmap with Dual Usability for Anchor and Non-Anchor Carrier

In some embodiments, a single shortened NPRS bitmap having a dual meaning can be introduced, depending on whether the carrier that is using it is an anchor or a non-anchor carrier. That is, the shortened bitmap could remain consisting of 4 bits, while its interpretation about the DL subframes containing NPRS would be different for the anchor and non-anchor carrier. One example is shown in Table 2 below.

TABLE 2

Shortened NPRS bitmap with dual meaning for TDD NB-IoT usable on both anchor carrier and non-anchor carriers

| Anchor | | | |
|---|---|---|---|
| SF3 | SF4 | SF7 | SF8 |
| Non-Anchor | | | |
| SF3 | SF4 | SF7 & SF5 | SF8 & SF9 |
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |

TABLE 2-continued

Shortened NPRS bitmap with dual meaning for TDD NB-IoT
usable on both anchor carrier and non-anchor carriers

| Anchor | | | |
|---|---|---|---|
| SF3 | SF4 | SF7 | SF8 |
| Non-Anchor | | | |
| SF3 | SF4 | SF7 & SF5 | SF8 & SF9 |
| 1 | 1 | 0 | 1 |
| 1 | 1 | 1 | 0 |
| 1 | 1 | 1 | 1 |

In this example, the subframes not containing NPRS are indicated with '0'. Subframes containing NPRS are indicated with '1'. For example, for the non-anchor carrier having '1' under [SF7 & SF5] means that both subframes SF7 and SF5 contain NPRS.

Accordingly, in some embodiments, there is provided a radio network node (e.g., eNodeB) that configures and transmits one or more TDD positioning reference signals (e.g., TDD NPRS). It can inform, implicitly or explicitly, another network node (e.g., another eNodeB or E-SMLC or O&M) about the TDD configuration and/or TDD NPRS configuration configured in one or more cells and/or carriers associated with the radio network node.

In some embodiments, there is provided a network node that indicates an NPRS carrier is a TDD carrier, and optionally indicates its TDD configuration.

In some embodiments, for NB-IoT TDD OTDOA measurement, a bitmap is sent (signaled) to the UE to indicate the NPRS subframes. The length of the bitmap can be based on the available number of DL subframes that in a NB-IoT TDD configuration remain available/usable after without including the subframes that are always uplink and special subframes for the used TDD configuration by the NPRS carrier. This way, for example, the bitmap may be associated with a subset of subframes within a certain period (e.g., a bitmap of 10 ms may be associated with 10 subframes that span over 16 ms). The bitmap is based on the available DL subframes in a NB-IoT TDD configuration. The bitmap may be created/generated by a network node (e.g., E-SMLC or eNodeB) and also interpreted by the UE based on commonly understood predefined and/or signaled rules (e.g., no UL and/or special subframe is included; in another example, the bitmap may also not include even some DL subframes that are of a specific type or having special properties and not suitable for NPRS). In a bitmap, a bit may be 1 if NPRS is transmitted, otherwise it may be 0.

In some embodiments, the bitmap is sent to the UE to indicate the NPRS subframes in NB-IoT TDD OTDOA measurement is less than 10 bits in a standalone deployment.

In some embodiments, the bitmap is sent to the UE to indicate the NPRS subframes in NB-IoT TDD OTDOA measurement is less than 10 bits in a guard-band deployment.

In some embodiments, the bitmap is sent to the UE to indicate the NPRS subframes in NB-IoT TDD OTDOA measurement is less than 40 bits in an in-band deployment.

In some embodiments, it is signaled whether an NPRS carrier is an anchor carrier in NB-IoT TDD.

In some embodiments, for NB-IoT TDD OTDOA measurement, a shortened bitmap is sent (signaled) to the UE to indicate the NPRS subframes on the anchor carrier. The length of the bitmap is based on the available number of DL subframes that in a NB-IoT TDD configuration remain available/usable after discarding the subframes that are always uplink for all the TDD configurations, the special subframes, and those subframes used for NPSS, NSSS, SIB1-NB, and NPBCH.

In some embodiments, for NB-IoT TDD OTDOA measurement, two shortened bitmaps are sent (signaled) to the UE to indicate the NPRS subframes on the anchor and non-anchor carrier respectively. The length of the bitmap(s) is based on the available number of DL subframes that in a NB-IoT TDD configuration remain available/usable on the anchor and non-anchor carrier after discarding the subframes that are always uplink for all the TDD configurations, the special subframes, and those subframes used for NPSS, NSSS, SIB1-NB, and NPBCH.

In some embodiments, for NB-IoT TDD OTDOA measurement, a single shortened bitmap is sent (signaled) to the UE to indicate the NPRS subframes on the anchor and non-anchor carrier respectively. The length of the bitmap is the same but interpreted differently by the anchor and non-anchor carrier based on the available number of DL subframes that in a NB-IoT TDD configuration remain available/usable on the anchor and non-anchor carrier after discarding the subframes that are always uplink for all the TDD configurations, the special subframes, and those subframes used for NPSS, NSSS, SIB1-NB, and NPBCH.

In accordance with these embodiments, an example LPP signaling message for NPRS TDD configuration is shown below.

```
-- ASN1START
PRS-Info-NB-r14 ::= SEQUENCE (SIZE (1..maxCarrier-r14)) OF NPRS-Info-r14
NPRS-Info-r14 ::= SEQUENCE {
        operationModeInfoNPRS-r14      ENUMERATED { inband, standalone },
        nprs-carrier-r14                CarrierFreq-NB-r14    OPTIONAL,    -- Cond
Standalone/Guardband
        nprsSequenceInfo-r14           INTEGER (0..174)      OPTIONAL, -- Cond Inband
        nprsID-r14                                           INTEGER (0..4095) OPTIONAL, -- Cond
NPRS-ID
        partA-r14                                   SEQUENCE {
            nprsBitmap-r14             CHOICE {
                subframePattern10-r14  BIT STRING (SIZE (10)),
                subframePattern40-r14          BIT STRING (SIZE (40))
            },
            nprs-MutingInfoA-r14       CHOICE {
                po2-r14                                      BIT STRING (SIZE(2)),
                po4-r14                                      BIT STRING (SIZE(4)),
```

```
                po8-r14                         BIT STRING (SIZE(8)),
                po16-r14                        BIT STRING (SIZE(16)),
                ...
            }                OPTIONAL,          -- Cond MutingA
        }                    OPTIONAL,          -- Cond PartA
        partB-r14                               SEQUENCE {
            nprs-Period-r14                     ENUMERATED { ms160, ms320, ms640, ms1280, ... },
            nprs-startSF-r14    ENUMERATED { zero, one-eighth, two-eighths, three-eighths,
                                                                  four-eighths, five-
eighths, six-eighths,
                                                                  seven-eighths, ...},
            nprs-NumSF-r14      ENUMERATED { sf10, sf20, sf40, sf80, sf160, sf320,
                                                                  sf640, sf1280, ... },
            nprs-MutingInfoB-r14 CHOICE {
                po2-r14                         BIT STRING (SIZE(2)),
                po4-r14                         BIT STRING (SIZE(4)),
                po8-r14                         BIT STRING (SIZE(8)),
                po16-r14                        BIT STRING (SIZE(16)),
                ...
            }                OPTIONAL,          -- Cond MutingB
        ...
        }                    OPTIONAL,          -- Cond PartB
    ...,
    [[
        partA-NB-TDD-r15                        SEQUENCE {
        nprsBitmap-NB-TDD-r15                   CHOICE {
            subframePattern4-r15 BIT STRING (SIZE (4)), --select for anchor
            subframePattern7-r15 BIT STRING (SIZE (7)), --select for non-anchor
            subframePattern7-r15 BIT STRING (SIZE (7)), --select for both anchor & non-
anchor
            ...                                 --future extension options
        }
        ]]                   OPTIONAL           -- Cond PartA-NB-TDD
    }
```

In some embodiments, for NB-IoT TDD OTDOA measurement, the NB-IoT TDD configuration is sent to the UE. The configuration can be per carrier and/or cell. The configuration may be an explicit or implicit NB-IoT TDD configuration. An example implicit configuration may comprise one or more indications or rules on how to determine a TDD configuration, e.g., an indication whether all cells and/or carriers have the same configuration as some cell (e.g., serving or reference cell) or carrier. The configuration may be provided in a UE-dedicated manner or via multicast/broadcast, e.g., broadcast positioning assistance data or even in the system information.

In some embodiments, for NB-IoT TDD OTDOA measurement, the NB-IoT TDD configuration sent to the UE can be done either on a NPRS carrier basis (that is explicitly signaled per NPRS carrier), or signal once for all the NPRS carriers at the same frequency (different NPRS carrier frequency can have different TDD configuration), or signal once for all the NPRS carriers that a UE need to measure.

In some embodiments, if the NB-IoT TDD configuration is not signaled to the UE, the UE can assume the TDD configuration for the NPRS carrier(s) that it needs to measure have the same configuration as the cell where it received the LPP configurations.

In some embodiments, if the NB-IoT TDD configuration is not signaled to the UE, the UE can assume the TDD configuration for the NPRS carrier(s) that it needs to measure have the same configuration as the reference cell which it received in LPP configurations.

As it pertains to Part B, more considerations may need to be taken. In NB-IoT FDD, the DL subframes are continuous, but in NB-IoT TDD, the DL subframes are interlaced with UL and special subframes. Therefore, if Part B is also adopted, the interpretation of the configurations provided by Part B need to be clarified. Due to the discontinuous nature of the NB-IoT TDD DL, this might result in the support of a subset of $N_{NPRS}$, $T_{NPRS}$, and/or α combinations compared to FDD.

It is noted that in NB-IoT FDD, $N_{NPRS}$ indicates the number of consecutive subframes that the UE can assume NPRS is transmitted. But in TDD, the DL subframes are not continuous, as DL and UL are sharing the same carrier frequency, and DL and UL subframes are interlaced. Therefore, the interpretation of $N_{NPRS}$ should be redefined in TDD. It can be assumed that $N_{NPRS}$ still indicates the number of consecutive DL subframes that contains NPRS, but this means the UE must keep track of the subframes that are not used for DL and postpone the DL. In some settings, this can result in overlapping of two NPRS periods, which also needs to be resolved by the UE.

Therefore, due to the periodicity nature of Part B configurations, it would be preferred that the UL subframes are counted in the $N_{NPRS}$, $T_{NPRS}$, and α used to configure the NPRS subframes. This is a similar principle as the configuration of the NPDCCH search space. It makes both the network node and UE easier to track the starting time of the NPRS transmission. This not only simplifies the UE behavior of tracking the DL NPRS subframes, but reduce the implementation efforts, as most of the implementations of FDD configurations can be applied with little or no change.

Accordingly, in some embodiments, when Part B is present in NPRS configuration for NB-IoT TDD, the subframes that are not suitable and cannot be used for positioning (e.g., UL or special subframes or even DL subframes of a specific type or with specific properties) are counted (e.g., in periodicity) but not used as NPRS subframes.

In some embodiments, when Part B is present in NPRS configuration for NB-IoT TDD, the special subframes are counted but not used for NPRS subframes.

In one embodiment, it is claimed that when Part B presents in NPRS configuration for NB-IoT TDD, the DL subframes which are indicated not valid for NPRS transmission (e.g., by using bitmap) are counted but not used for NPRS subframes.

In addition, due to UE capability, the OTDOA RSTD measurement in NB-IoT FDD is performed in idle mode. This is expected to be the same for NB-IoT TDD uses. Therefore, it is possible for an NB-IoT TDD use to measure an NB-IoT FDD carrier, and vice versa. In this case, it is only possible to use Part A and Part B together, especially for the legacy Rel-14 FDD UEs which may not understand the NB-IoT TDD signaling. In this case, Part B can be used indicate the periodicity settings of the NPRS, and Part A can be used to indicate which subframe in the radio frame is valid for the actual NPRS transmission.

In some embodiments, an NB-IoT TDD UE can be configured to perform measurements on NPRS in NB-IoT FDD downlink carrier for OTDOA positioning.

In some embodiments, an NB-IoT FDD UE can be configured to perform measurements on NPRS in NB-IoT TDD downlink carrier for OTDOA positioning.

In some embodiments, when a bitmap (i.e., Part A) is signaled together with Part B to indicate NPRS configuration for NB-IoT TDD, the TDD configuration is not signaled. This is to enable the NB-IoT FDD UEs to measurement NB-IoT TDD carriers for positioning, and this also enables the NB-IoT TDD UEs to measurement NB-IoT FDD carriers for positioning.

In some embodiments, the NPRS generation for NB-TDD can be selected based upon Frequency re-use factor of 4. This can provide denser NPRS configuration; 3 symbols at a given time rather than only 2 if re-use factor of 4 is used. For NB-TDD, there are limited DL resource availability, so it would be wise to have denser NPRS configuration. Using Frequency re-use of 4 would still provide reasonable neighbor cell for NPRS measurements, further muting can be applied to minimize interference. From 3GPP TS 36.211, the below equations with mod 6 can be evaluated with mod 4 for mapping the generated signals to resource element.

$$k=6m+(6-l+v_{shift}) \bmod 6$$

where $v_{shift}=N_{ID}^{NPRS} \bmod 6$ $m=0,1$

Figure 6:
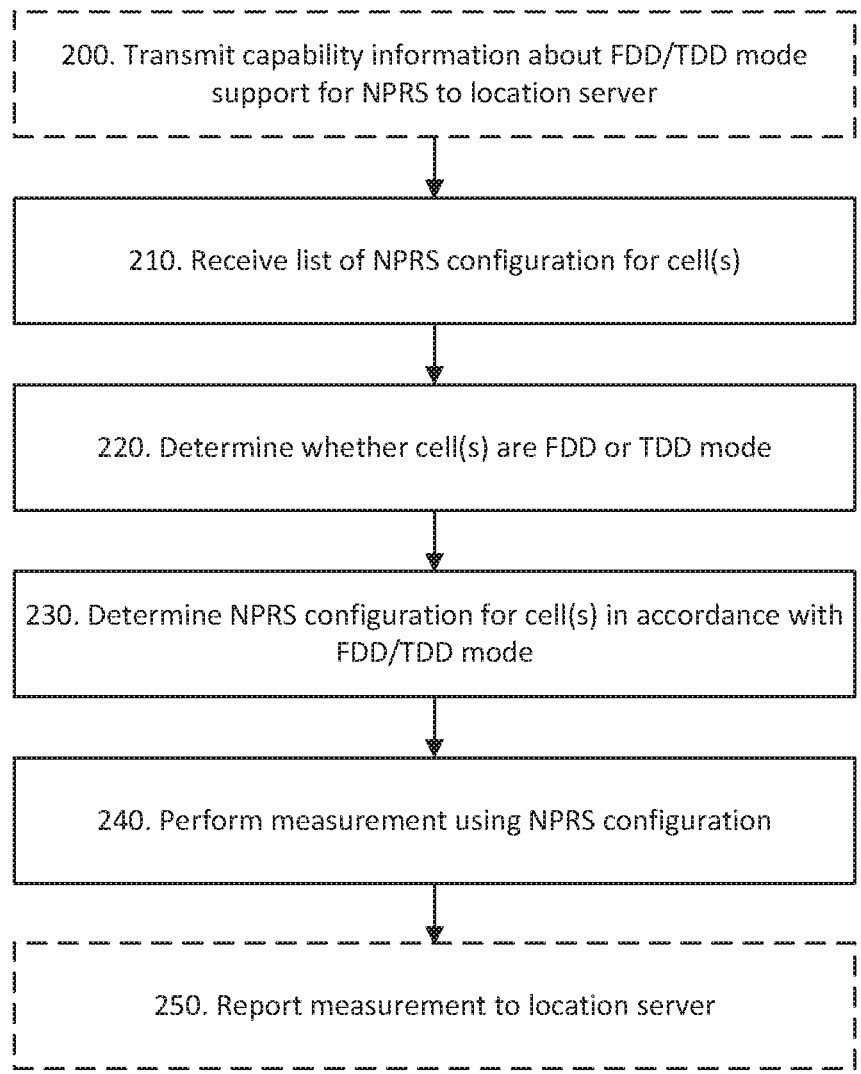
FIG. 6 is a flow chart illustrating a method which can be performed in a wireless device.

FIG. 6 is a flow chart illustrating a method which can be performed in a wireless device (e.g. a target device), such as UE 110. The method can include:

Step 200: Optionally, the wireless device can inform the network node (e.g. a location server) about its capabilities in supporting TDD or FDD, optionally triggered by a capability request message from the location server. The capabilities indication can further indicate that the wireless device supports a certain type(s) of positioning and/or measurement.

Step 210: The wireless device receives a list of at least one reference and/or neighbor cell NPRS configuration information from the location server. This signaling can be based on either network-based or UE-based positioning request triggering. The configuration information can include at least one of a first NPRS bitmap for FDD mode and/or a second NPRS bitmap for TDD mode. In some embodiments, the information can contain the cells with TDD NPRS configurations and/or the cells with FDD NPRS configurations as one list or two separate lists. In some embodiments, the second NPRS bitmap for TDD can be a shortened bitmap (e.g. shorter in length than the first NPRS bitmap for FDD). In some embodiments, the second NPRS bitmap for TDD can be less than 10 bits in length.

Step 220: The wireless device determines the FDD/TDD mode of each cell and/or the radio network node(s) associated with each cell. In some embodiments, the wireless device can determine that the cell operates in TDD mode in accordance with the capabilities request and/or indication. In some embodiments, the wireless device can determine that the cell operates in TDD mode in accordance with receiving the second NPRS bitmap for TDD from the network node.

Step 230: The wireless device determines a NPRS configuration for each cell according to the corresponding determined TDD/FDD mode. For example, in response to determining that the cell operates in FDD mode, the NPRS configuration can be determined in accordance with the first NPRS bitmap for FDD mode. Alternatively, in response to determining that the cell operates in TDD mode, the NPRS configuration is determined in accordance with the second NPRS bitmap for TDD mode. In some embodiments, determining the NPRS configuration can includes mapping the NPRS bitmap to subframe numbers. In some embodiments, in the list of neighbor cells, the wireless device may only consider the radio network nodes in which their signals are measurable at the device's location.

Step 240: The wireless device performs a measurement using the determined NPRS configuration. For example, the wireless device can measure/estimate the time difference of arrival of a pair of radio network nodes (reference and neighbor cells) as has been described herein. The measurement(s) may be performed while the device is in idle mode.

Step 250: The wireless device optionally transmits a measurement report(s) to the location server for further positioning estimation processing. In the case of UE-based positioning methods, the measurement(s) can be used at the device itself to do self-localization.

It will be appreciated that one or more of the above steps can be performed simultaneously and/or in a different order. Also, steps illustrated in dashed lines are optional and can be omitted in some embodiments.

Figure 7:
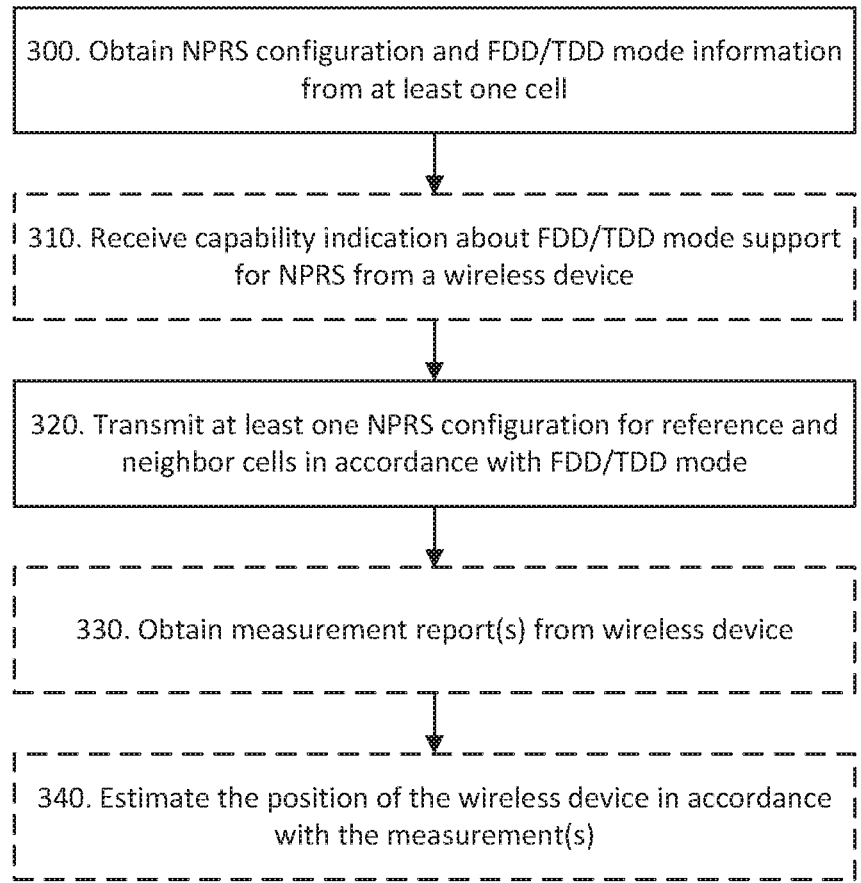
FIG. 7 is a flow chart illustrating a method which can be performed in a network node.

FIG. 7 is a flow chart illustrating a method which can be performed in a network node such as location server 130. The location server can be a E-SMLC as has been described herein. The method can include:

Step 300: The network node obtains NPRS configuration information and the TDD/FDD mode information associated with at least one cell, for example, from each respective radio access node.

Step 310: Optionally, the network node obtains, from a wireless device, a capabilities indication indicating its TDD (or FDD) mode support. Optionally, the capabilities indication is in response to a capability request message transmitted by the network node. The capabilities indication can further indicate that the wireless device supports a certain type(s) of positioning and/or measurement.

Step 320: The network node transmits at least one NPRS configuration (e.g. for reference and neighbor cells) to the wireless device. This can be in response to receiving a positioning request, either triggered by another network node or by the wireless device. The network node can generate NPRS configuration information for the cell in accordance with the FDD/TDD mode of the cell. For example, the NPRS configuration information can include a first NPRS bitmap for FDD mode and/or a second NPRS bitmap for TDD mode.

In some embodiments, the NPRS bitmap for TDD can be a shortened bitmap (e.g. shorter in length than the NPRS bitmap for FDD). In some embodiments, the NPRS bitmap for TDD can be less than 10 bits in length. In some embodiments, the length of the NPRS bitmap for TDD mode can be based at least in part on an available number of downlink subframes.

Step 330: The network node optionally obtains, from the wireless device, a measurement report. The measurement report can include a list of time difference of arrival measurements.

Step 340: Optionally, the network node can derive a positioning estimation for the wireless device based on the received measurements.

It will be appreciated that one or more of the above steps can be performed simultaneously and/or in a different order. Also, steps illustrated in dashed lines are optional and can be omitted in some embodiments.

Figure 8:
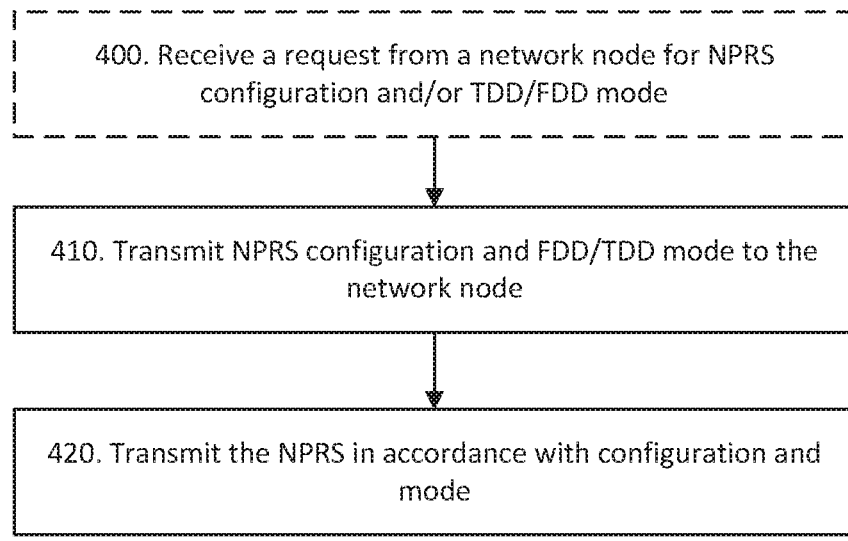
FIG. 8 is a flow chart illustrating a method which can be performed in a radio access node.

FIG. 8 is a flow chart illustrating a method which can be performed in a network node such as radio access node 120. The network node can be an eNB or gNB as have been described herein. The method can include:

Step 400: The radio access node can optionally receive a request for NPRS configuration and/or FDD/TDD mode support from another (e.g. a second) network node, such as a location server.

Step 410: The radio access node then transmits its NPRS configuration and FDD/TDD mode support information to the second network node.

Step 420: The radio access node transmits the NPRS based on the set configuration and mode.

It will be appreciated that one or more of the above steps can be performed simultaneously and/or in a different order. Also, steps illustrated in dashed lines are optional and can be omitted in some embodiments.

In some embodiments, it has been discussed that on the anchor carrier, only SF3, SF4, SF7, and/or SF8 can potentially be used for receiving NPRS. Therefore, the bitmap could consist of 4 bits.

Alternatively, for the non-anchor carrier there is more freedom, in terms of DL, the candidate subframes for receiving NPRS could be SF3, SF4, SF5, SF6, SF7, SF8, and SF9 (i.e., depending on the TDD configuration), and depending on whether new agreements are reached or not for the non-anchor carrier (e.g., it can be agreed that SIB1 will be transmitted on the non-anchor carrier at least in SF #0).

It is also possible to have one bitmap per TDD configuration, consisting of different lengths depending on the number of DL suitable for NPRS.

Based on the above, a number of alternatives are available for NPRS configuration representation in TDD mode.

In some embodiments, one shortened bitmap consisting of 4 bits is introduced, usable on both anchor and non-anchor carriers (i.e., only SF3, SF4, SF7, and/or SF8 as available per configuration would be used for receiving NPRS). This makes possible to save a significant number of bits, but it wouldn't be possible to exploit some other usable DL subframes on the non-anchor carrier. It was also mentioned that having only four usable DL subframes for receiving NPRS could be too few subframes, and that some requirements couldn't be passed, but there needs to be a relaxation on some of the requirements because in any case the anchor carrier has no more than SF3, SF4, SF7, and/or SF8 usable for NPRS, and in some cases, such as in TDD Configuration #1 only SF4 would be usable for receiving NPRS.

In some embodiments, two shortened bitmaps are introduced, one consisting of 4 bits for the anchor carrier, and one consisting of 7 bits for the non-anchor carrier. This option is consistent with what is available on the anchor carrier and exploits the usability of the extra available DL subframes on the non-anchor carrier. A disadvantage may be that the bitmap is not unified for anchor and non-anchor carriers, but this option still allows for saving bits.

In some embodiments, a single dual meaning shortened bitmap is introduced consisting of 4 bits having, which interpretation would be different depending on whether the carrier that is using it is an anchor or a non-anchor carrier. For example, on the anchor carrier the 4-bit NPRS bitmap would refer to the potential usability of SF3, SF4, SF7, and/or SF8 for receiving NPRS, while on the non-anchor carrier the same 4-bit NPRS bitmap would refer to the potential usability of SF3, SF4, SF7+SF5, and/or SF8+SF9 for receiving NPRS. This alternative allows, by using a single shortened NPRS bitmap, to utilize the available DL subframes on the anchor carrier and exploits the usability of the extra available DL subframes on the non-anchor carrier.

In some embodiments, one bitmap per TDD configuration (i.e., 6 bitmaps) is introduced, usable on both anchor and non-anchor carriers, where each bitmap consists of different lengths depending on number of DL subframes.

In some embodiments, based on the NB-IoT frame structure, the signaling of the bitmap for NPRS configuration can be reused and the modifications are minimized.

Some embodiments can enable TDD mode while providing the possibility to have both FDD and TDD cells/carriers to be measured by the NB-IoT device.

Some embodiments consider minimum standardization and signaling impact to provide the TDD-OTDOA capability feature.

Figure 9:
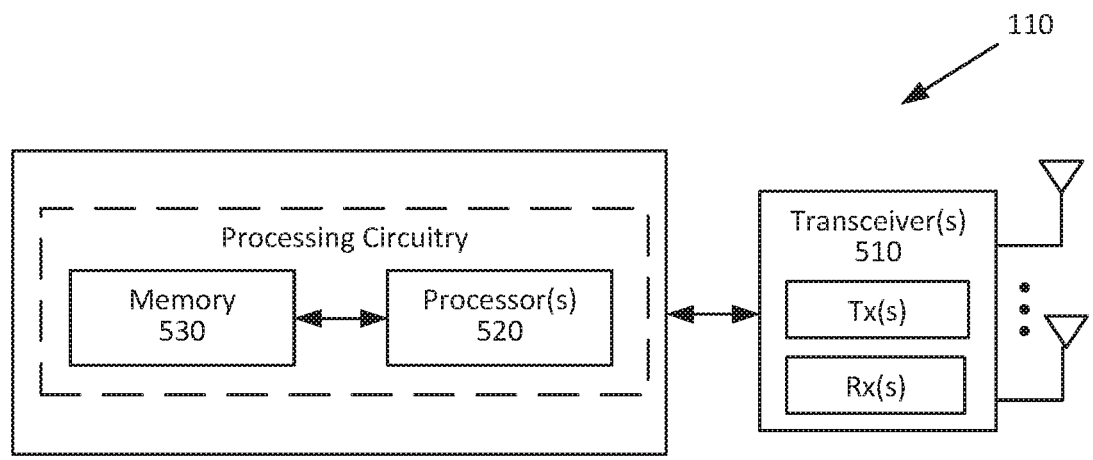
FIG. 9 is a block diagram of an example wireless device.

FIG. 9 is a block diagram of an example wireless device, UE 110, in accordance with certain embodiments. In some embodiments, wireless device 110 can be a NB-IoT device. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 9 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
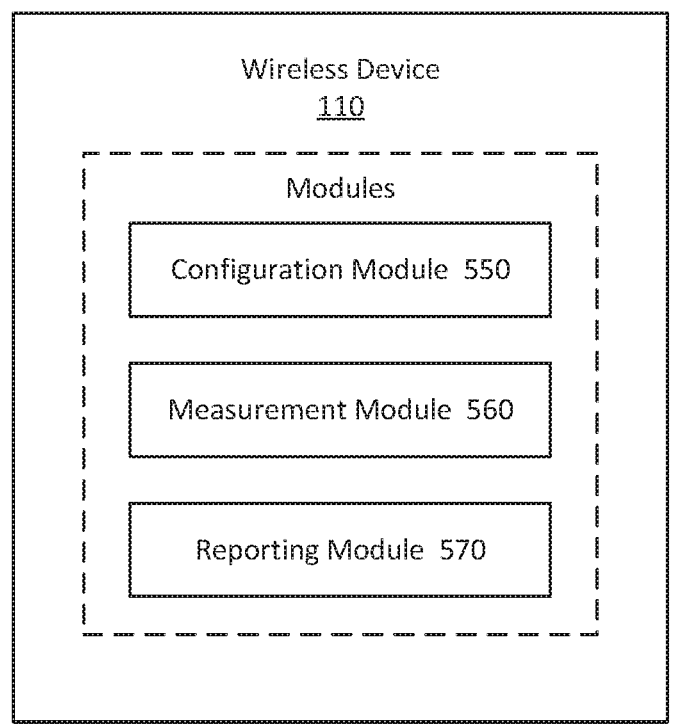
FIG. 10 is a block diagram of an example wireless device with modules.

In some embodiments, the wireless device UE 110 may comprise a series of modules configured to implement the functionalities of the wireless device described above. Referring to FIG. 10, in some embodiments, the wireless device 110 may comprise a configuration module 550 for obtaining and configuring NPRS configuration and FDD/TDD mode information, a measurement module 560 for performing radio measurements, and a reporting module 570 for reporting measurement(s) to a network node.

It will be appreciated that the various modules may be implemented as combination of hardware and software, for instance, the processor, memory and transceiver(s) of UE 110 shown in FIG. 9. Some embodiments may also include additional modules to support additional and/or optional functionalities.

Figure 11:
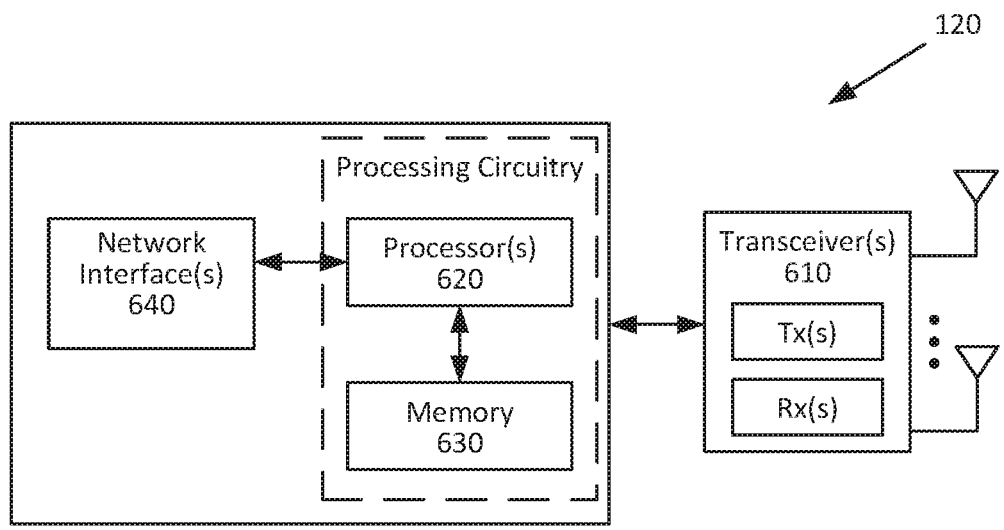
FIG. 11 is a block diagram of an example radio access node.

FIG. 11 is a block diagram of an exemplary radio access node 120, in accordance with certain embodiments. Radio access node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of radio access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of radio access node 120 can include additional components beyond those shown in FIG. 11 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 9 and 11 may be included in other network nodes (such as core network node 130). Other network nodes may optionally include or not include a wireless interface (such as the transceiver described in FIGS. 9 and 11).

Figure 12:
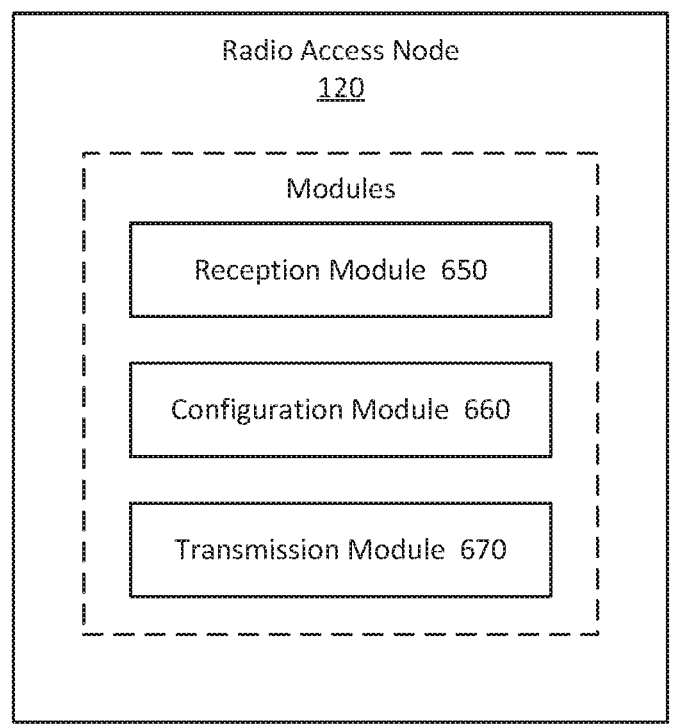
FIG. 12 is a block diagram of an example radio access node with modules.

In some embodiments, the radio access node 120, may comprise a series of modules configured to implement the functionalities of the network node described above. Referring to FIG. 12, in some embodiments, the radio access node 120 can comprise a reception module 650 for receiving a request for NPRS configuration and/or FDD/TDD mode information, a configuration module 660 for determining and transmitting NPRS configuration and/or FDD/TDD mode information, and a transmission module 670 for transmitting NPRS information.

It will be appreciated that the various modules may be implemented as combination of hardware and software, for instance, the processor, memory and transceiver(s) of radio access node 120 shown in FIG. 11. Some embodiments may also include additional modules to support additional and/or optional functionalities.

Figure 13:
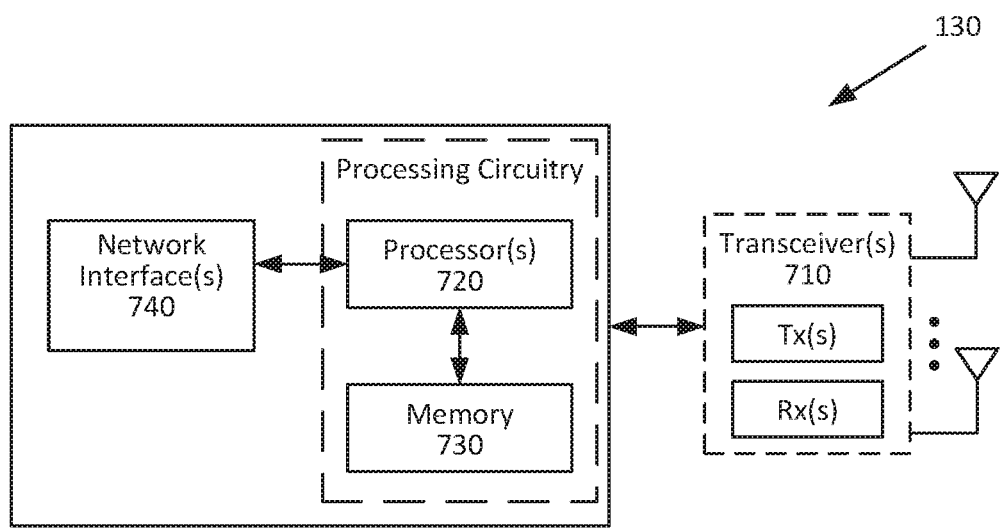
FIG. 13 is a block diagram of an example network node.

FIG. 13 is a block diagram of an exemplary network node 130, such as location server 130, in accordance with certain embodiments. Network node 130 may include one or more of a transceiver 710, processor 720, memory 730, and network interface 740. In some embodiments, the transceiver 710 facilitates transmitting wireless signals to and receiving wireless signals from wireless devices, such as UE 110 (e.g., via transmitter(s) (Tx), receiver(s) (Rx), and antenna(s)) and/or radio access node(s) 120 and/or other network nodes. The processor 720 executes instructions to provide some or all of the functionalities described above as being provided by a network node 130, the memory 730 stores the instructions executed by the processor 720. In some embodiments, the processor 720 and the memory 730 form processing circuitry. The network interface 740 can communicate signals to backend network components, such as a gateway, switch, router, Internet, Public Switched Telephone Network (PSTN), core network nodes or radio network controllers, etc.

The processor 720 can include any suitable combination of hardware to execute instructions and manipulate data to perform some or all of the described functions of network node 130, such as those described above. In some embodiments, the processor 720 may include, for example, one or more computers, one or more central processing units (CPUs), one or more microprocessors, one or more application specific integrated circuits (ASICs), one or more field programmable gate arrays (FPGAs) and/or other logic.

The memory 730 is generally operable to store instructions, such as a computer program, software, an application including one or more of logic, rules, algorithms, code, tables, etc. and/or other instructions capable of being executed by a processor 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 740 is communicatively coupled to the processor 720 and may refer to any suitable device operable to receive input for node 130, send output from node 130, perform suitable processing of the input or output or both, communicate to other devices, or any combination of the preceding. The network interface 740 may include appropriate hardware (e.g., port, modem, network interface card, etc.) and software, including protocol conversion and data processing capabilities, to communicate through a network.

Other embodiments of network node 130 can include additional components beyond those shown in FIG. 13 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 14:
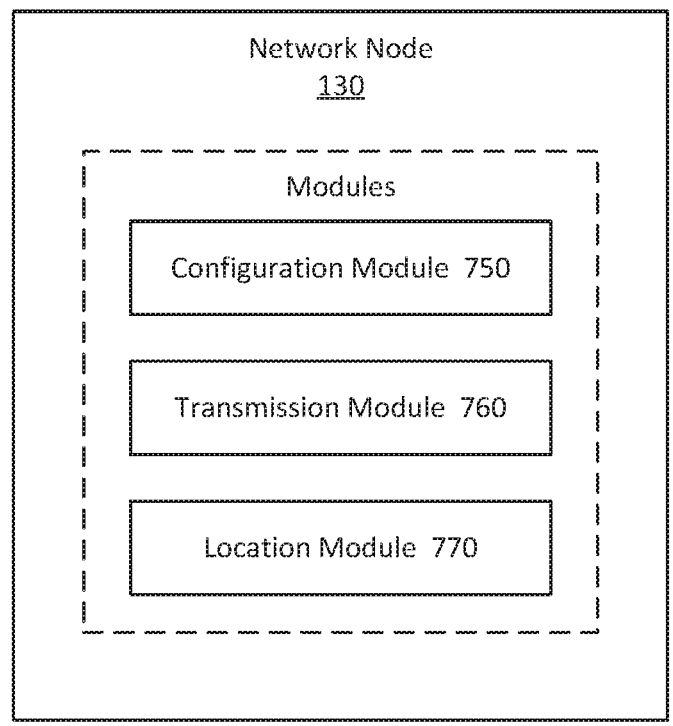
FIG. 14 is a block diagram of an example network node with modules.

In some embodiments, the network node 130, may comprise a series of modules configured to implement the functionalities of the network node described above. Referring to FIG. 14, in some embodiments, the network node 130 can comprise a configuration module 750 for obtaining NPRS configuration and/or FDD/TDD mode information from at least one of a cell (e.g. radio access node) and/or a wireless device, a transmission module 760 for transmitting at least one NPRS configuration, and a location module 770 for estimating the position/location of a wireless device.

It will be appreciated that the various modules may be implemented as combination of hardware and software, for instance, the processor, memory and transceiver(s) of network node 130 shown in FIG. 13. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
 3GPP Third Generation Partnership Project
 ACK Acknowledgement
 AP Access point
 ARQ Automatic Repeat Request
 BS Base Station
 BSC Base station controller
 BTS Base transceiver station
 CA Carrier Aggregation
 CC Component carrier
 CCCH SDU Common Control Channel SDU
 CG Cell group
 CGI Cell Global Identifier
 CQI Channel Quality information
 CSI Channel State Information
 DAS Distributed antenna system
 DC Dual connectivity
 DCCH Dedicated Control Channel
 DCI Downlink Control Information
 DL Downlink
 DMRS Demodulation Reference Signal
 eMBB Enhanced Mobile Broadband
 eNB E-UTRAN NodeB or evolved NodeB
 ePDCCH enhanced Physical Downlink Control Channel
 E-SMLC evolved Serving Mobile Location Center
 E-UTRA Evolved UTRA
 E-UTRAN Evolved UTRAN
 FDM Frequency Division Multiplexing
 HARQ Hybrid Automatic Repeat Request
 HO Handover
 IoT Internet of Things
 LTE Long-Term Evolution
 M2M Machine to Machine
 MAC Medium Access Control
 MBMS Multimedia Broadcast Multicast Services
 MCG Master cell group
 MDT Minimization of Drive Tests
 MeNB Master eNode B
 MME Mobility Management Entity MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a wireless device, the method comprising:
   receiving Narrowband Positioning Reference Signal (NPRS) configuration information for a cell, the NPRS configuration information including at least one of a first NPRS bitmap for Frequency Division Duplex (FDD) mode and a second NPRS bitmap for Time Division Duplex (TDD) mode, wherein the second NPRS bitmap for TDD is shorter in length than the first NPRS bitmap for FDD, and wherein the second NPRS bitmap for TDD is less than 10 bits in length;
   responsive to determining that the cell operates in TDD mode, determining a NPRS configuration in accordance with the second NPRS bitmap for TDD mode; and
   performing measurements using the NPRS configuration.

2. The method of claim 1, further comprising, transmitting a capabilities indication indicating the wireless device supports TDD mode.

3. The method of claim 2, wherein transmitting the capabilities indication is responsive to receiving a capabilities request.

4. The method of claim 1, wherein determining the NPRS configuration includes mapping the second NPRS bitmap to subframe numbers.

5. The method of claim 1, wherein performing measurements includes estimating time of arrival (TOA) signals from at least one radio access node.

6. The method of claim 1, wherein performing measurements includes determining Observed Time Difference of Arrival (OTDOA) measurements.

7. The method claim 1, further comprising, transmitting at least one measurement report.

8. The method of claim 1, wherein the wireless device is a Narrowband Internet of Things (NB-IoT) FDD device configured to perform measurements on a NB-IoT TDD downlink carrier.

9. A wireless device comprising a radio interface and processing circuitry configured to:
   receive Narrowband Positioning Reference Signal (NPRS) configuration information for a cell, the NPRS configuration information including at least one of a first NPRS bitmap for Frequency Division Duplex (FDD) mode and a second NPRS bitmap for Time Division Duplex (TDD) mode, wherein the second NPRS bitmap for TDD is shorter in length than the first NPRS bitmap for FDD, and wherein the second NPRS bitmap for TDD is less than 10 bits in length;
   responsive to determining that the cell operates in TDD mode, determine a NPRS configuration in accordance with the second NPRS bitmap for TDD mode; and
   perform measurements using the NPRS configuration.

10. The wireless device of claim 9, further configured to transmit a capabilities indication indicating the wireless device supports TDD mode.

11. The wireless device of claim 10, wherein transmitting the capabilities indication is responsive to receiving a capabilities request.

12. The wireless device of claim 9, wherein determining the NPRS configuration includes mapping the second NPRS bitmap to subframe numbers.

13. The wireless device of claim 9, wherein performing measurements includes estimating time of arrival (TOA) signals from at least one radio access node.

14. The wireless device of claim 9, wherein performing measurements includes determining Observed Time Difference of Arrival (OTDOA) measurements.

15. The wireless device of claim 9, further configured to transmit at least one measurement report.

16. The wireless device of claim 9, wherein the wireless device is a Narrowband Internet of Things (NB-IoT) FDD device configured to perform measurements on a NB-IoT TDD downlink carrier.

17. A method performed by a network node, the method comprising:
obtaining Narrowband Positioning Reference Signal (NPRS) configuration and one of Frequency Division Duplex (FDD) and Time Division Duplex (TDD) mode information associated with a cell;
responsive to determining that the cell operates in TDD mode, generating NPRS configuration information for the cell, the NPRS configuration information including a NPRS bitmap for TDD mode, wherein the NPRS bitmap for TDD is shorter in length than an NPRS bitmap for FDD, and wherein the second NPRS bitmap for TDD is less than 10 bits in length; and
transmitting the NPRS configuration information to a wireless device.

18. A network node comprising a radio interface and processing circuitry configured to:
obtain Narrowband Positioning Reference Signal (NPRS) configuration and one of Frequency Division Duplex (FDD) and Time Division Duplex (TDD) mode information associated with a cell;
responsive to determining that the cell operates in TDD mode, generate NPRS configuration information for the cell, the NPRS configuration information including a NPRS bitmap for TDD mode, wherein the NPRS bitmap for TDD is shorter in length than an NPRS bitmap for FDD, and wherein the second NPRS bitmap for TDD is less than 10 bits in length; and
transmit the NPRS configuration information to a wireless device.

19. The network node of claim 18, further configured to receive a capabilities indication indicating that the wireless device supports TDD mode.

20. The network node of claim 19, wherein receiving the capabilities indication is responsive to transmitting a capabilities request.

21. The network node of claim 18, wherein transmitting the NPRS configuration information is responsive to receiving a positioning request.

22. The network node of claim 18, wherein the length of the NPRS bitmap for TDD mode is based at least in part on an available number of downlink subframes.

23. The network node of claim 18, wherein the NPRS configuration information includes an indication of whether an NPRS carrier is an anchor carrier.

24. The network node of claim 18, wherein generating the NPRS bitmap for TDD mode includes removing at least one of a subframe used for uplink in TDD and a special subframe for TDD.

25. The network node of claim 18, wherein generating the NPRS bitmap for TDD includes removing a subframe used for at least one of Narrowband Primary Synchronization Signal (NPSS), Narrowband Secondary Synchronization Signal (NSSS), and Narrowband Physical Broadcast channel (NPBCH).

26. The network node of claim 18, further configured to derive a positioning estimate for the wireless device in accordance with a received measurement report.

* * * * *